(12) United States Patent
Luo

(10) Patent No.: US 12,046,152 B1
(45) Date of Patent: Jul. 23, 2024

(54) SIMULATED CRAWLING ROBOT AND CONTROL METHOD THEREFOR

(71) Applicant: HOMETIME INDUSTRIAL CO., LTD., Shenzhen (CN)

(72) Inventor: Xiang Luo, Shenzhen (CN)

(73) Assignee: HOMETIME INDUSTRIAL CO., LTD., Shenzhen (CN)

( * ) Notice: Subject to any disclaimer, the term of this patent is extended or adjusted under 35 U.S.C. 154(b) by 0 days.

(21) Appl. No.: 18/348,307

(22) Filed: Jul. 6, 2023

(30) Foreign Application Priority Data

May 30, 2023 (CN) .......................... 202310625407.2

(51) Int. Cl.
| | | |
|---|---|---|
| G09B 23/36 | (2006.01) | |
| A63H 13/02 | (2006.01) | |
| A63H 21/04 | (2006.01) | |
| B25J 11/00 | (2006.01) | |

(52) U.S. Cl.
CPC ............ G09B 23/36 (2013.01); A63H 13/02 (2013.01); A63H 21/04 (2013.01); B25J 11/003 (2013.01)

(58) Field of Classification Search
CPC ........ A63H 11/18; A63H 13/02; A63H 18/00; A63H 21/00; A63H 21/04; G09B 23/36; B25J 11/003
See application file for complete search history.

(56) References Cited

U.S. PATENT DOCUMENTS

| | | | | |
|---|---|---|---|---|
| 1,938,129 A | * | 12/1933 | Arnold ................... | A63H 13/02 446/23 |
| 2,603,485 A | * | 7/1952 | Countryman ............ | A63H 3/00 446/268 |
| 3,477,172 A | * | 11/1969 | Polewski ............. | A63H 18/021 446/445 |
| 3,603,505 A | * | 9/1971 | Tsugawa ................ | A63H 18/00 238/10 E |
| 3,648,407 A | * | 3/1972 | Pressman ............... | A63H 18/08 104/246 |
| 3,698,130 A | * | 10/1972 | Usami .................... | A63H 18/08 446/445 |
| 4,217,727 A | * | 8/1980 | Fetty .................... | A63H 18/021 104/295 |
| 4,632,038 A | * | 12/1986 | Lawrence ............... | B61B 13/04 105/141 |
| 5,507,679 A | * | 4/1996 | Getsay ................... | A63H 18/00 104/126 |

(Continued)

FOREIGN PATENT DOCUMENTS

| | | | | |
|---|---|---|---|---|
| WO | WO-2009100594 A1 | * | 8/2009 | ............. A63H 17/26 |
| WO | WO-2012005741 A1 | * | 1/2012 | ............. A63H 11/04 |

*Primary Examiner* — Eugene L Kim
*Assistant Examiner* — Alyssa M Hylinski

(57) ABSTRACT

A simulated crawling robot includes a spider web support frame, an arc-shaped track is fixedly mounted on the spider web support frame via a track fixing screw; a spider bionic robot is movably mounted on the arc-shaped track via a straddle wheel set; the spider bionic robot is connected to a rotary joint at the center of the spider web support frame via a slave connect wire; a gear drive mechanism is provided in the spider bionic robot to drive the spider bionic robot forward; the gear drive mechanism is connected to a spider leg slave mechanism via a gear transmission; and the spider leg slave mechanism is connected to a bionic spider leg via a gear transmission.

7 Claims, 4 Drawing Sheets

(56) References Cited

U.S. PATENT DOCUMENTS

| | | | | |
|---|---|---|---|---|
| 5,988,684 | A | * | 11/1999 | Blaustein ............... A63H 33/38 |
| | | | | 281/38 |
| 9,233,313 | B2 | * | 1/2016 | Olivera .................. A63H 11/20 |
| 11,179,649 | B2 | * | 11/2021 | Wang ..................... A63H 18/16 |
| 2008/0108276 | A1 | * | 5/2008 | Willett ................. A63H 11/205 |
| | | | | 446/353 |
| 2009/0117820 | A1 | * | 5/2009 | Willett ................. A63H 11/205 |
| | | | | 446/353 |
| 2017/0216735 | A1 | * | 8/2017 | Yakos .................. A63H 17/262 |

* cited by examiner

SIMULATED CRAWLING ROBOT AND CONTROL METHOD THEREFOR

CROSS-REFERENCE TO RELATED APPLICATIONS

This application claims priority to Chinese Patent Application No. 202310625407.6 with a filing date of May 30, 2023. The content of the aforementioned application, including any intervening amendments thereto, is incorporated herein by reference.

TECHNICAL FIELD

The present disclosure relates to the field of simulated robots, and in particular to a simulated crawling robot and a control method therefor.

BACKGROUND ART

The simulated robot is also called bionic robot. It refers to a robot that imitates creatures and works with biological characteristics. The simulated robot has broad application prospects in various fields. In the field of education, the simulated robot can educate students of various biological knowledge, and can avoid the boring and tastes of textbook teaching. It also does not need real contact with dangerous organisms. The representative one is a spider simulated robot.

Traditional spider-type simulated crawling robot, such as Chinese patent CN205984082U, a kind of teaching simulation machine spider, is a robot for education, and has insufficient similarity with spider appearance. Thus, it is difficult for students to associate it with the spider itself. It is difficult to simulate the attitude of spider crawling on the spider web. It is difficult for students to know the real appearance and activity attitude of the spider. The simulation effect is not good. The structure is complex and it has larger limitation.

SUMMARY OF THE DISCLOSURE

It is an object of the present disclosure to provide a simulated crawling robot and a control method therefor, so as to solve the problems of the above-mentioned background art that the present conventional spider simulated crawling robot has a poor simulation effect and a great limitation in use.

In order to achieve the above object, the present disclosure provides the following technical solutions. A simulated crawling robot comprises a spider web support frame, wherein an arc-shaped track is fixedly mounted on the spider web support frame via a track fixing screw; a spider bionic robot is movably mounted on the arc-shaped track via a straddle wheel set; the spider bionic robot is connected to a rotary joint at the center of the spider web support frame via a slave connect wire; a power wire is connected below the rotary joint; a gear drive mechanism is provided in the spider bionic robot to drive the spider bionic robot to move forward; the gear drive mechanism is connected to a spider leg slave mechanism via a gear transmission; the spider leg slave mechanism is connected to a bionic spider leg via a gear transmission; two groups of LED lamp beads are provided at the eyes of the spider bionic robot; a chain sheath is fixedly connected to the tail of the spider bionic robot, the chain sheath; and the slave connect wire passes through the chain sheath and is connected to the rotary joint.

Further, the spider web support frame comprises an octagonal inner spider web and a spliced outer spider web, wherein the octagonal inner spider web is in an octagonal shape and is located in the middle of the spider web support frame; four groups of spliced outer spider webs are provided around the spider web support frame; a locked connecting block are provided below the periphery of the octagonal inner spider web; a locked connecting groove are provided on the spliced outer spider web; and the octagonal inner spider web and the spliced outer spider web are locked and connected by means of the locked connecting block and the locked connecting groove.

Further, a fixing suction cup is locked and connected at the tip of the spliced outer spider web.

Further, the arc-shaped track curves in an arc shape around a circumference of the spider web support frame, and the path of the arc-shaped track conforms to the position of the spider web skeleton of the spider web support frame, so as to facilitate the connection of the track fixing screw and provide aesthetic appeal.

Further, the cross section of the arc-shaped track is in a shape of "cross", and a track arc-shaped rack is machined on a side below the arc-shaped track.

Further, the straddle wheel set comprises a positioning wheel support frame; two ends of the positioning wheel support frame are movably connected to a straddle positioning wheel; the straddle positioning wheel is provided with two groups, and the two groups of straddle positioning wheels are respectively located at two sides of the arc-shaped track; the two groups of straddle positioning wheels clamp the arc-shaped track in the middle; an aligning clamp wheel is provided at the rear side of the positioning wheel support frame; a power gear is provided at a side of the aligning clamp wheel; the aligning clamp wheel and the power gear sandwich the arc-shaped track in the middle; and intermediate parts of the straddle positioning wheel, the aligning clamp wheel and the power gear are all provided with a locked groove matching with the cross-sectional shape of the arc-shaped track so as to prevent the straddle wheel set from falling out of the arc-shaped track.

Further, the gear drive mechanism comprises a drive motor; the drive motor is provided in the spider bionic robot; a small pulley is fixedly connected to an output end of the drive motor via a keyway; the small pulley is connected to a large pulley via a belt drive; a first gear is fixedly connected below the large pulley, the first gear meshing with a second gear; a third gear fixedly connected above the second gear, the third gear meshing with a fourth gear; a fifth gear is fixedly connected below the fourth gear, the fifth gear meshing with a sixth gear; a seventh gear is fixedly connected below the sixth gear, the seventh gear meshing with an eighth gear; and the eighth gear is fixedly connected to the power gear.

Further, the spider leg slave mechanism comprises a ninth gear; the first gear meshes with the ninth gear, and the ninth gear meshes with a tenth gear; a worm is fixedly connected below the tenth gear; the worm is drivingly connected with a worm wheel, with one side of the worm wheel being fixedly connected with an eccentric connecting rod via a driving rod, and the eccentric connecting rod is movably connected with a bionic spider leg via an eccentric sleeve; and the eccentric sleeve and the bionic spider leg are provided with four groups, and the eccentric connecting rods at each group of the bionic spider leg have a phase difference of 90 degrees in turn.

The present disclosure also discloses a control method for a simulated crawling robot. The method is used for controlling the simulated crawling robot. The control method for the simulated crawling robot comprises:

acquiring trusted crawling speed control change data of a target simulated crawling robot by a plurality of crawling speed control strategies, and generating a training basis cluster of the target simulated crawling robot based on the trusted crawling speed control change data, wherein the training basis cluster comprises a training basis corresponding to each crawling speed control strategy;

inputting speed control environment configuration features of the target simulated crawling robot into a crawling speed control decision model with initialized model weight parameters, and generating a crawling speed control decision data cluster of the target simulated crawling robot, wherein the crawling speed control decision data cluster comprises crawling speed control decision data corresponding to each crawling speed control strategy;

determining a model convergence index of the crawling speed control decision model based on the training basis cluster, the crawling speed control decision data cluster, and crawling speed control change situations in the crawling speed control decision data cluster; and updating weight information of the crawling speed control decision model based on the model convergence index, and generating the crawling speed control decision model after training, wherein the crawling speed control decision model after training is configured for performing a crawling speed control decision on any input speed control environment configuration feature of a designated simulated crawling robot, and performing crawling speed control on the designated simulated crawling robot according to a crawling speed control decision result. The above-mentioned method is controlled and processed by a controller in the simulated crawling robot.

Further, the generating a training basis cluster of the target simulated crawling robot based on the regularly converted trusted crawling speed control change data comprises:

performing regularization conversion on the trusted crawling speed control change data of the target simulated crawling robot by the plurality of crawling speed control strategies, and generating the regularly converted trusted crawling speed control change data; and generating a training basis cluster of the target simulated crawling robot based on the regularly converted trusted crawling speed control change data.

Compared with the prior art, the disclosure has the following beneficial effects.

The present disclosure enables the spider bionic robot to crawl on the spider support frame along the arc-shaped track by means of the spider support frame and the arrangement of the arc-shaped track, so as to truly simulate the appearance and daily activity state of the spider. At the same time, the spider web support frame can be attached on the blackboard by a suction cup, and the spider web support frame can be disassembled into five parts for folding, so as to facilitate storage and carrying.

The present disclosure, by the arrangement of the spider leg slave mechanism and the bionic spider leg, enables the drive motor to drive the spider bionic robot to move forward along the arc-shaped track. At the same time, it can also drive the bionic spider leg to perform a climbing motion, imitating the real limb motion of the spider crawlin. It is more realistic and has a better simulation effect, thereby solving the problems of the above-mentioned background art that the simulation effect of the current traditional spider simulated crawling robot is not good and the use limitation is larger.

In the present disclosure, a high-precision training basis cluster can be obtained based on the trusted crawling speed control change data of the target simulated crawling robot by the crawling speed control strategy. The model construction relationship between the target simulated crawling robot and the crawling speed control strategy is completed by the speed control environment configuration features of the target simulated crawling robot and the crawling speed control decision data cluster. The model convergence index of the crawling speed control decision model is determined based on the crawling speed control change situation in the training basis cluster, the crawling speed control decision data cluster and the crawling speed control decision data cluster. The established crawling speed control decision model can be more widely applied to the trusted crawling speed control of the simulated crawling robot from a plurality of modalities, so as to improve the crawling speed control decision performance of the crawling speed control decision model. Thus, it improves the control efficiency of the simulated crawling robot, and further solves the problems of the above-mentioned background art that the current traditional spider simulated crawling robot has a poor simulation effect and a large limitation in use.

Figure 1:
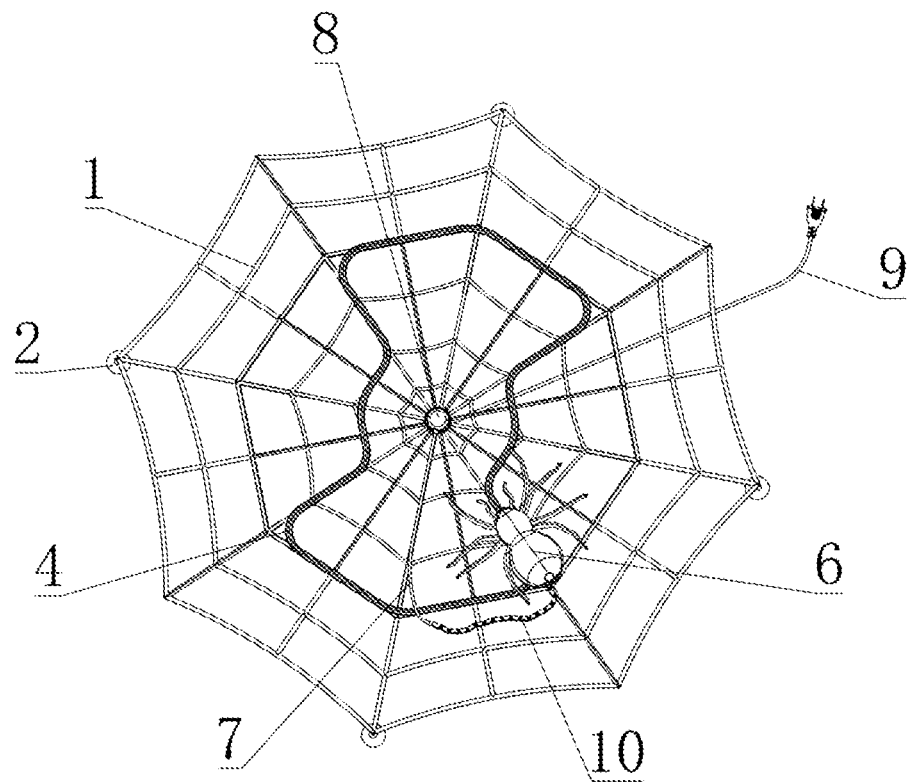
FIG. 1 is a appearance structure diagram of the present disclosure.

Reference numerals in the drawings: 1, spider web support frame; 101, octagonal inner spider web; 102, spliced outer spider web; 103, locked connecting block; 104, locked connecting groove; 2, fixing suction cup; 3, track fixing screw; 4, arc-shaped track; 401, track arc-shaped rack; 5, straddle wheel set; 501, positioning wheel support frame; 502, straddle positioning wheel; 503, aligning clamp wheel; 504, power gear; 6, spider bionic robot; 7, slave connect wire; 8, rotary joint; 9, power wire; 10, chain sheath; 11, gear drive mechanism; 1101, drive motor; 1102, small pulley; 1103, large pulley; 1104, first gear; 1105, second gear; 1106, third gear; 1107, fourth gear; 1108, fifth gear; 1109, sixth gear; 1110, seventh gear; 1111, eighth gear; 12, spider leg slave mechanism; 1201, ninth gear; 1202, tenth gear; 1203, worm; 1204, worm wheel; 1205, driving rod; 1206, eccentric connecting rod; 1207, eccentric sleeve; 13, bionic spider leg; 14, LED lamp bead.

DETAILED DESCRIPTION OF THE DISCLOSURE

The technical solutions in the embodiments of the disclosure will be described clearly and completely in conjunction with the accompanying drawings in the embodiments of the disclosure. Obviously, the described embodiments are only part of the embodiments of the disclosure, rather than all of the embodiments. Based on the embodiments in the disclosure, all other embodiments obtained by a person skilled in the art without involving any inventive effort are within the scope of protection of the disclosure.

In order to further understand the contents of the present disclosure, the present disclosure is described in detail with reference to the accompanying drawings.

With reference to FIG. 1, the simulated crawling robot includes a spider web support frame 1. An arc-shaped track 4 is fixedly mounted on the spider web support frame 1 via a track fixing screw 3. A spider bionic robot 6 is movably mounted on the arc-shaped track 4 via a straddle wheel set 5. The spider bionic robot 6 is connected to a rotary joint 8 at the center of the spider web support frame 1 via a slave connect wire 7. A power line 9 is connected below the rotary joint 8. A gear drive mechanism 11 is provided in the spider bionic robot 6 to drive the spider bionic robot 6 to move forward. The gear drive mechanism 11 is connected to a spider leg slave mechanism 12 via a gear transmission. The spider leg slave mechanism 12 is connected to a bionic spider leg 13 via a gear transmission. Two groups of LED lamp beads 14 are provided at the eyes of the spider bionic robot 6.

Figure 2:
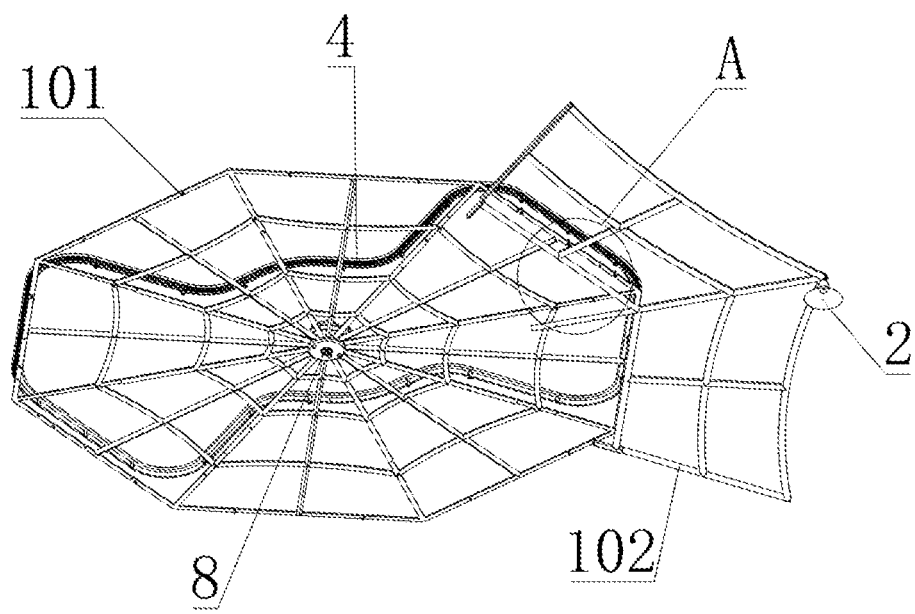
FIG. 2 is a structure diagram of a spider web support frame according to the present disclosure.
Figure 3:
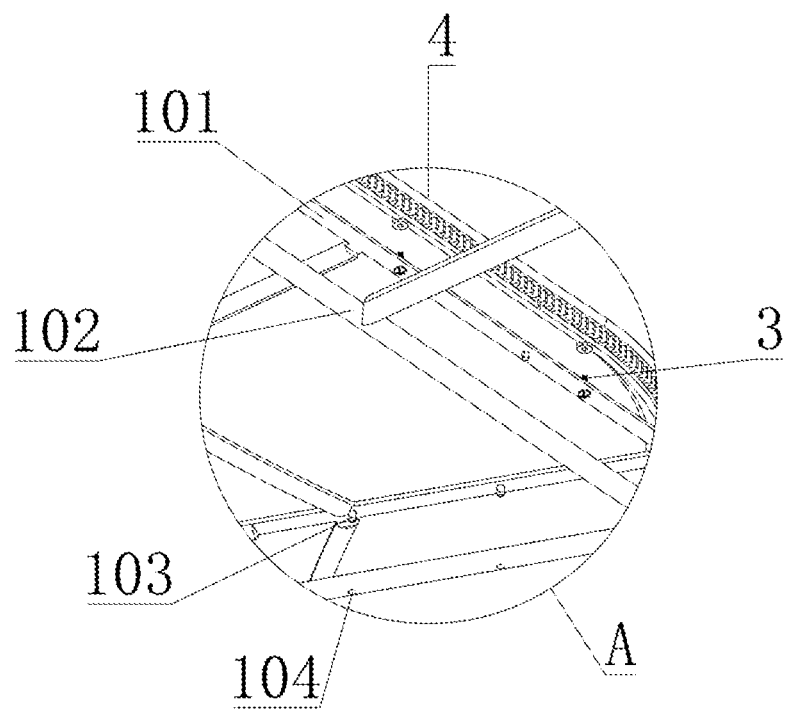
FIG. 3 is an enlarged view at A of FIG. 2 according to the present disclosure.

With reference to FIGS. 1-3, the spider web support frame 1 comprises an octagonal inner spider web 101 and a spliced outer spider web 102. The octagonal inner spider web 101 is in an octagonal shape and is located in the middle of the spider web support frame 1. Four groups of spliced outer spider webs 102 are provided around the spider web support frame 1. A locked connecting block 103 are provided below the periphery of the octagonal inner spider web 101. A locked connecting groove 104 is provided on the spliced outer spider web 102. The octagonal inner spider web 101 and the spliced outer spider web 102 are locked and connected by means of the locked connecting block 103 and the locked connecting groove 104. Thus, four groups of spliced outer spider webs 102 and the octagonal inner spider web 101 can be spliced and combined. The locked connecting block 103 on the octagonal inner spider web 101 can be inserted into the locked connecting groove 104 on the spliced outer spider web 102 during splicing, so that the spider web support frame 1 is assembled and completed. A fixing suction cup 2 is locked and connected at the tip of the spliced outer spider web 102, so that the spider web support frame 1 can be attached on a smooth wall surface such as a blackboard via a fixing suction cup 2 for displaying. The arc-shaped track 4 curves in an arc shape around a circumference of the spider web support frame 1. The path of the arc-shaped track (4) conforms to the position of the spider web skeleton of the spider web support frame 1, so as to facilitate the connection of the track fixing screw 3 and provide aesthetic appeal.

Figure 4:
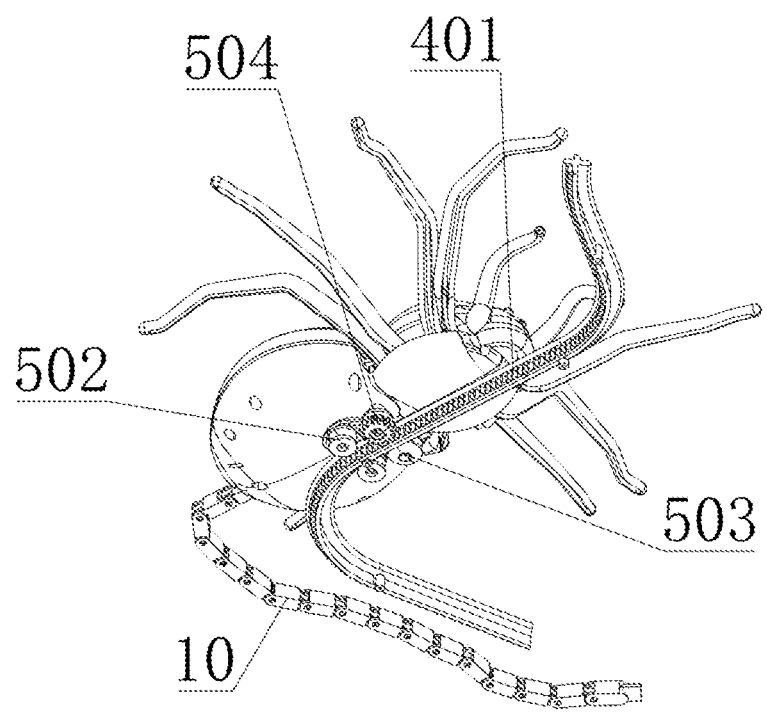
FIG. 4 is a structure diagram I of a straddle wheel set according to the present disclosure.

With reference to FIGS. 1 and 4, a chain sheath 10 is fixedly connected to the tail of the spider bionic robot 6, the chain sheath 10. The slave electric wire 7 passes through the chain sheath 10 and is connected to the rotary joint 8, so that when the spider bionic robot 6 moves around along the arc-shaped track 4, the slave electric wire 7 will drive the rotary joint 8 to rotate and keeps electric connection. At the same time, the electric wire is kept from being wound. The chain sheath 10 can prevent the slave electric wire 7 from being scratched and worn when moving. Also, the slave electric wire 7 can be kept sagging, so that winding cannot easily occur.

Figure 5:
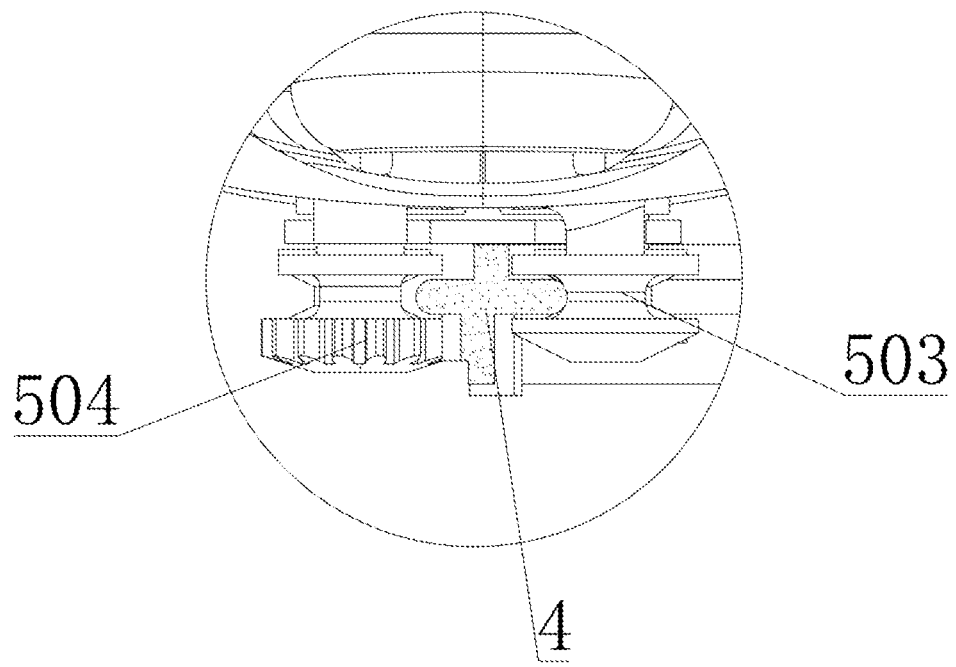
FIG. 5 is a structure diagram II of a straddle wheel set according to the present disclosure.

With reference to FIGS. 4 and 5, the straddle wheel set 5 includes a positioning wheel support frame 501. Two ends of the positioning wheel support frame 501 are movably connected to a straddle positioning wheel 502. The straddle positioning wheel 502 is provided with two groups, and the two groups of straddle positioning wheels 502 are respectively located at two sides of the arc-shaped track 4. The two groups of straddle positioning wheels 502 clamp the arc-shaped track 4 in the middle. An aligning clamp wheel 503 is provided at the rear side of the positioning wheel support frame 501. A power gear 504 is provided at a side of the aligning clamp wheel 503. The aligning clamp wheel 503 and the power gear 504 sandwich the arc-shaped track 4 in the middle. The cross section of the arc-shaped track 4 is in a shape of "cross", and a track arc-shaped rack 401 is machined on a side below the arc-shaped track 4. Intermediate parts of the straddle positioning wheel 502, the aligning clamp wheel 503 and the power gear 504 are all provided with a locked groove matching with the cross-sectional shape of the arc-shaped track 4 so as to prevent the straddle wheel set 5 from falling out of the arc-shaped track 4. Thus, the spider bionic robot 6 will not fall out. When the spider bionic robot 6 turns, the positioning wheel support frame 501 can rotate and drive the straddle positioning wheel 502 to turn.

Figure 6:
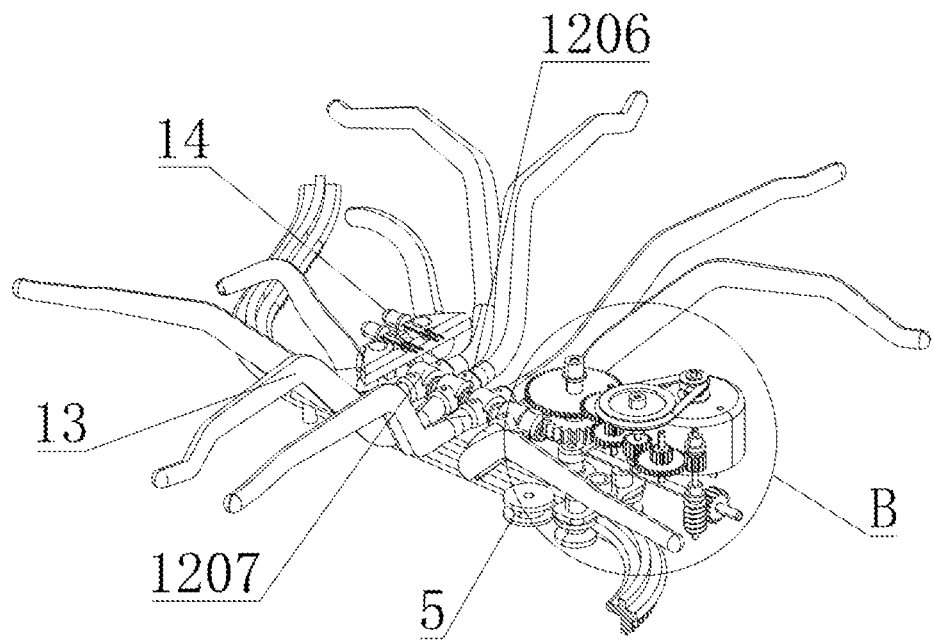
FIG. 6 is a structure diagram of a spider bionic robot according to the present disclosure.
Figure 7:
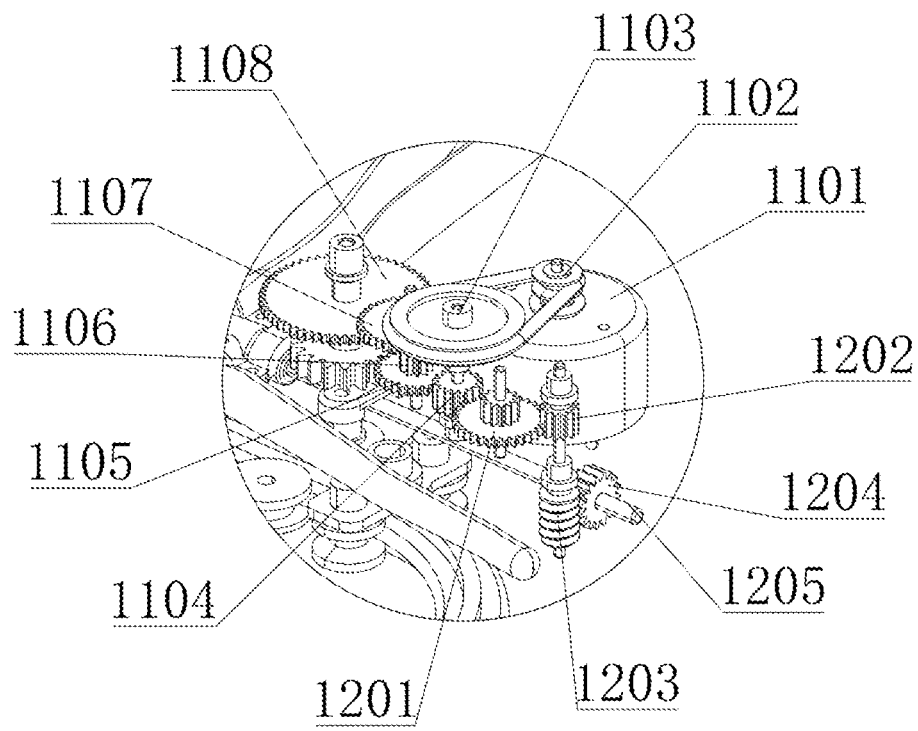
FIG. 7 is an enlarged view at B of FIG. 6 according to the present disclosure.
Figure 8:
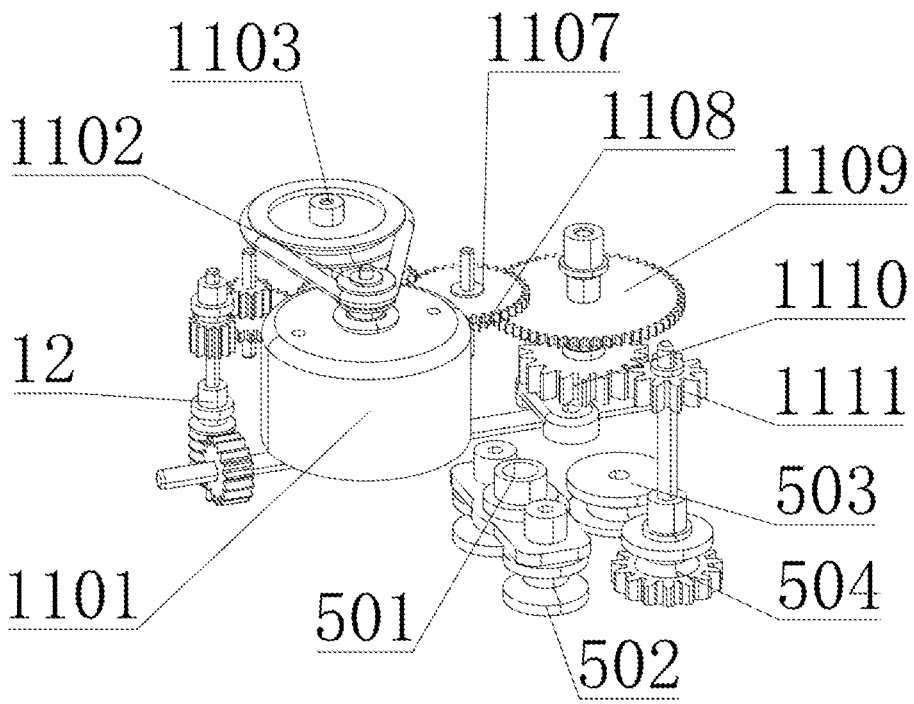
FIG. 8 is a structure diagram of a gear drive mechanism according to the present disclosure.

With reference to FIGS. 6-8, the gear drive mechanism 11 includes a drive motor 1101. The drive motor 1101 is provided in the spider bionic robot 6. A small pulley 1102 is fixedly connected to an output end of the drive motor 1101 via a keyway. The small pulley 1102 is connected to a large pulley 1103 via a belt drive. A first gear 1104 is fixedly connected below the large pulley 1103, the first gear 1104 meshing with a second gear 1105. A third gear 1106 is fixedly connected above the second gear 1105, the third gear 1106 meshing with a fourth gear 1107. A fifth gear 1108 is fixedly connected below the fourth gear 1107, the fifth gear 1108 meshing with a sixth gear 1109. A seventh gear 1110 is fixedly connected below the sixth gear 1109, the seventh gear 1110 meshing with an eighth gear 1111. The eighth gear 1111 is fixedly connected with the power gear 504. Thus, after the drive motor 1101 is started, the small pulley 1102 will be driven to rotate. When the small pulley 1102 rotates, the large pulley 1103 will be driven to rotate by a belt. The large belt wheel 1103 drives the first gear 1104 to rotate, and the first gear 1104 drives the second gear 1105 meshing therewith to rotate. The second gear 1105 drives the third gear 1106 to rotate, and the third gear 1106 drives the fourth gear 1107 meshing therewith to rotate. The fourth gear 1107 drives the fifth gear 1108 to rotate, and the fifth gear 1108 drives the sixth gear 1109 meshing therewith to rotate. The sixth gear 1109 drives the seventh gear 1110 to rotate, and the seventh gear 1110 drives the eighth gear 1111 meshing therewith to rotate. The eighth gear 1111 rotates the power gear 504, and the power gear 504 meshes with the track arc-shaped rack 401 on the arc-shaped track 4, so that the spider bionic robot 6 moves forward along the arc-shaped track 4.

With reference to FIGS. 7 and 8, the spider leg slave mechanism 12 includes a ninth gear 1201. The first gear 1104 meshes with the ninth gear 1201, and the ninth gear 1201 meshed with a tenth gear 1202. A worm 1203 is fixedly connected below the tenth gear 1202. The worm 1203 is drivingly connected with a worm wheel 1204, with one side of the worm wheel 1204 being fixedly connected with an eccentric connecting rod 1206 via a driving rod 1205, and the eccentric connecting rod 1206 is movably connected with a bionic spider leg 13 via an eccentric sleeve 1207.

Thus, when the drive motor 1101 drives the first gear 1104 to rotate, the first gear 1104 also drives the ninth gear 1201 to rotate. When the ninth gear 1201 rotates, the tenth gear 1202 rotates. The tenth gear 1202 drives the worm 1203 to rotate. The worm 1203 drives the worm wheel 1204 to rotate. The worm wheel 1204 drives the eccentric connecting rod 1206 to rotate via the driving rod 1205. When the eccentric connecting rod 1206 rotates, the four groups of bionic spider legs 13 are driven to perform a crawling action via the cooperation with the eccentric sleeve 1207. Since the eccentric connecting rods 1206 at each group of bionic spider legs 13 successively have a phase difference of 90 degrees in turn, each group of bionic spider legs 13 will successively move alternately in sequence, which is more consistent with the motion posture of spider legs.

Working principle. During the use of the simulated crawling robot, firstly, four groups of spliced outer spider webs 102 and octagonal inner spider webs 101 may be spliced and combined. During splicing, the locked connecting block 103 on the octagonal inner spider web 101 can be inserted into the locked connecting groove 104 on the spliced outer spider web 102 so as to assemble the spider web support frame 1. Then the spider web support frame 1 may be attached on a smooth wall surface such as a blackboard via the fixing suction cup 2 for displaying.

After the spider web support frame 1 is fixed, it may be charged with electricity via a power line 9. At this moment, the drive motor 1101 in the gear drive mechanism 11 is started, which will drive the small pulley 1102 to rotate. When the small pulley 1102 rotates, the large pulley 1103 is driven to rotate via a belt. The large pulley 1103 drives the first gear 1104 to rotate, and the first gear 1104 drives the second gear 1105 meshing therewith to rotate. The second gear 1105 drives the third gear 1106 to rotate, and the third gear 1106 drives the fourth gear 1107 meshing therewith to rotate. The fourth gear 1107 drives the fifth gear 1108 to rotate, and the fifth gear 1108 drives the sixth gear 1109 meshing therewith to rotate. The sixth gear 1109 drives the seventh gear 1110 to rotate, and the seventh gear 1110 drives the eighth gear 1111 meshing therewith to rotate. The eighth gear 1111 drives the power gear 504 to rotate, and the power gear 504 meshes with the track arc-shaped rack 401 on the arc-shaped track 4. Therefore, the spider bionic robot 6 will move forward along the arc-shaped track 4. Since the cross section of the arc-shaped track 4 is in a "cross" shape, and the intermediate parts of the straddle positioning wheel 502, the aligning clamp wheel 503 and the power gear 504 are all provided with a locked groove matching with the cross-sectional shape of the arc-shaped track 4, so that when the spider bionic robot 6 moves along the arc-shaped track 4, the aligning clamp wheel 503 matches with the power gear 504 to clamp the arc-shaped track 4, and the two groups of straddle positioning wheels 502 will also clamp the arc-shaped track 4. Thus, the spider bionic robot 6 will not fall out. When the spider bionic robot 6 turns, the positioning wheel support frame 501 can rotate and drive the straddle positioning wheel 502 to turn.

When the spider bionic robot 6 moves forward along the arc-shaped track 4 and the drive motor 1101 drives the first gear 1104 to rotate, the first gear 1104 also drives the ninth gear 1201 to rotate. When the ninth gear 1201 rotates, the tenth gear 1202 rotates. The tenth gear 1202 drives the worm 1203 to rotate. The worm 1203 drives the worm wheel 1204 to rotate. The worm wheel 1204 drives the eccentric connecting rod 1206 to rotate via the driving rod 1205. When the eccentric connecting rod 1206 rotates, the four groups of bionic spider legs 13 are driven to perform a crawling action via the cooperation with the eccentric sleeve 1207. Since the eccentric connecting rods 1206 at each group of bionic spider legs 13 successively have a phase difference of 90 degrees in turn, each group of bionic spider legs 13 will successively move alternately in sequence, which is more consistent with the motion posture of spider legs.

When the spider bionic robot 6 moves around along the arc-shaped track 4, the slave electric wire 7 will drive the rotary joint 8 to rotate and keeps electric connection. At the same time, the electric wire is kept from being wound. The chain sheath 10 can prevent the slave electric wire 7 from being scratched and worn when moving. Also, the slave electric wire 7 can be kept sagging, so that winding cannot easily occur.

The embodiment of the present disclosure also discloses a control method for a simulated crawling robot. The method is used for controlling the simulated crawling robot. The control method for the simulated crawling robot includes:
    acquiring trusted crawling speed control change data of a target simulated crawling robot by a plurality of crawling speed control strategies, and generating a training basis cluster of the target simulated crawling robot based on the trusted crawling speed control change data, wherein the training basis cluster comprises a training basis corresponding to each crawling speed control strategy;
    inputting speed control environment configuration features of the target simulated crawling robot into a crawling speed control decision model with initialized model weight parameters, and generating a crawling speed control decision data cluster of the target simulated crawling robot, wherein the crawling speed control decision data cluster comprises crawling speed control decision data corresponding to each crawling speed control strategy;
    determining a model convergence index of the crawling speed control decision model based on the training basis cluster, the crawling speed control decision data cluster, and crawling speed control change situations in the crawling speed control decision data cluster; and
    updating weight information of the crawling speed control decision model based on the model convergence index, and generating the crawling speed control decision model after training, wherein the crawling speed control decision model after training is configured for performing a crawling speed control decision on any input speed control environment configuration feature of a designated simulated crawling robot, and performing crawling speed control on the designated simulated crawling robot according to a crawling speed control decision result. The above-mentioned method is controlled and processed by a controller in the simulated crawling robot.

In an embodiment of the present disclosure, the generating a training basis cluster of the target simulated crawling robot based on the regularly converted trusted crawling speed control change data includes:
    performing regularization conversion on the trusted crawling speed control change data of the target simulated crawling robot by the plurality of crawling speed control strategies, and generating the regularly converted trusted crawling speed control change data; and
    generating a training basis cluster of the target simulated crawling robot based on the regularly converted trusted crawling speed control change data.

In the present disclosure, a high-precision training basis cluster can be obtained based on the trusted crawling speed control change data of the target simulated crawling robot by the crawling speed control strategy. The model construction relationship between the target simulated crawling robot and the crawling speed control strategy is completed by the speed control environment configuration features of the target simulated crawling robot and the crawling speed control decision data cluster. The model convergence index of the crawling speed control decision model is determined based on the crawling speed control change situation in the training basis cluster, the crawling speed control decision data cluster and the crawling speed control decision data cluster. The established crawling speed control decision model can be more widely applied to the trusted crawling speed control of the simulated crawling robot from a plurality of modalities, so as to improve the crawling speed control decision performance of the crawling speed control decision model. Thus, it improves the control efficiency of the simulated crawling robot, and further solves the problems of the above-mentioned background art that the current traditional spider simulated crawling robot has a poor simulation effect and a large limitation in use.

While embodiments of the present disclosure have been shown and described, it will be understood by those skilled in the art that various changes, modifications, substitutions and alterations may be made herein without departing from the principles and spirit of the disclosure, the scope of which is defined by the appended claims and their equivalents.

What is claimed is:

1. A simulated crawling robot comprising a spider web support frame (1), characterized in that an arc-shaped track (4) is fixedly mounted on the spider web support frame (1) via a track fixing screw (3); a spider bionic robot (6) is movably mounted on the arc-shaped track (4) via a straddle wheel set (5); the spider bionic robot (6) is connected to a rotary joint (8) at a center of the spider web support frame (1) via a slave connect wire (7); a power wire (9) is connected below the rotary joint (8); a gear drive mechanism (11) is provided in the spider bionic robot (6) to drive the spider bionic robot (6) to move forward; the gear drive mechanism (11) is connected to a spider leg slave mechanism (12) via a gear transmission; the spider leg slave mechanism (12) is connected to a bionic spider leg (13) via a gear transmission; two LED (light-emitting diode) lamp beads (14) are provided at eyes of the spider bionic robot (6); a chain sheath (10) is fixedly connected to a tail of the spider bionic robot (6); and the slave connect wire (7) passes through the chain sheath (10) and is connected to the rotary joint (8).

2. The simulated crawling robot according to claim 1, characterized in that the spider web support frame (1) comprises an octagonal inner spider web (101) and a outer spider web (102), wherein the octagonal inner spider web (101) is in an octagonal shape and is located in the middle of the spider web support frame (1); four outer spider webs (102) are provided around the spider web support frame (1); a locked connecting block (103) is provided below the periphery of the octagonal inner spider web (101); each of the four outer spider webs (102) has a locked connecting groove (104); and each of the outer spider webs are locked and connected to the octagonal inner spider web (101) by means of the locked connecting block (103) and respective locked connecting grooves (104).

3. The simulated crawling robot according to claim 2, characterized in that a fixing suction cup (2) is locked and connected at a tip of each of the outer spider webs (102).

4. The simulated crawling robot according to claim 1, characterized in that the arc-shaped track (4) has a cross-shaped cross section and a track arc-shaped rack (401) is machined into a lateral side of the arc-shaped track (4).

5. The simulated crawling robot according to claim 4, characterized in that the straddle wheel set (5) comprises a positioning wheel support frame (501); two ends of the positioning wheel support frame (501) are movably connected to two straddle positioning wheels (502); the two straddle positioning wheels (502) are respectively located at two sides of the arc-shaped track (4); the two straddle positioning wheels (502) clamp the arc-shaped track (4) in the middle; an aligning clamp wheel (503) is provided at the rear side of the positioning wheel support frame (501); a power gear (504) is provided at a side of the aligning clamp wheel (503); the aligning clamp wheel (503) and the power gear (504) sandwich the arc-shaped track (4) in the middle; and intermediate parts of the straddle positioning wheel (502), the aligning clamp wheel (503) and the power gear (504) are all provided with a locked groove engaging with the cross-shaped cross section of the arc-shaped track (4) to prevent the straddle wheel set (5) from falling out of the arc-shaped track (4).

6. The simulated crawling robot according to claim 5, characterized in that the gear drive mechanism (11) comprises a drive motor (1101); the drive motor (1101) is provided in the spider bionic robot (6); a small pulley (1102) is fixedly connected to an output end of the drive motor (1101) via a keyway; the small pulley (1102) is connected to a large pulley (1103) via a belt drive; a first gear (1104) is fixedly connected below the large pulley (1103), the first gear (1104) meshing with a second gear (1105); a third gear (1106) fixedly connected above the second gear (1105), the third gear (1106) meshing with a fourth gear (1107); a fifth gear (1108) is fixedly connected below the fourth gear (1107), the fifth gear (1108) meshing with a sixth gear (1109); a seventh gear (1110) is fixedly connected below the sixth gear (1109), the seventh gear (1110) meshing with an eighth gear (1111); and the eighth gear (1111) is fixedly connected to the power gear (504).

7. The simulated crawling robot according to claim 6, characterized in that the spider leg slave mechanism (12) comprises a ninth gear (1201); the first gear (1104) meshes with the ninth gear (1201), and the ninth gear (1201) meshes with a tenth gear (1202); a worm (1203) is fixedly connected below the tenth gear (1202); the worm (1203) is drivingly connected with a worm wheel (1204), with one side of the worm wheel (1204) being fixedly connected with an eccentric connecting rod (1206) via a driving rod (1205), and the eccentric connecting rod (1206) is movably connected with a bionic spider leg (13) via an eccentric sleeve (1207).

* * * * *